United States Patent
Satoh et al.

(10) Patent No.: US 6,775,101 B2
(45) Date of Patent: Aug. 10, 2004

(54) MAGNETIC HEAD INCLUDING SLIDER ELECTRICALLY CONNECTED TO FLEXURE WITH CONDUCTIVE RESIN FILM

(75) Inventors: Hidezi Satoh, Niigata-ken (JP); Takashi Kimura, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 176 days.

(21) Appl. No.: 10/099,911

(22) Filed: Mar. 15, 2002

(65) Prior Publication Data

US 2003/0053256 A1 Mar. 20, 2003

(30) Foreign Application Priority Data

Mar. 16, 2001 (JP) .......................................... 2001-076779
Oct. 10, 2001 (JP) .......................................... 2001-313144

(51) Int. Cl.$^7$ .............................................. G11B 21/20
(52) U.S. Cl. ................................................... 360/234.6
(58) Field of Search ............................... 360/234.6, 323, 360/234.5

(56) References Cited

U.S. PATENT DOCUMENTS

| 5,644,454 A | | 7/1997 | Arya et al. ............... 360/245.8 |
| 5,657,186 A | * | 8/1997 | Kudo et al. ............... 360/234.5 |
| 5,696,652 A | | 12/1997 | Satoh ....................... 360/234.6 |
| 5,710,682 A | | 1/1998 | Arya et al. ............... 360/245.8 |

FOREIGN PATENT DOCUMENTS

| EP | 892027 A1 | * | 1/1999 |
| JP | 02158657 A | * | 6/1990 |

* cited by examiner

Primary Examiner—Tianjie Chen
(74) Attorney, Agent, or Firm—Brinks Hofer Gilson & Lione

(57) ABSTRACT

In a magnetic head having a slider provided with a thin-film element used for writing and/or reading, a flexure bonded to the slider and having a tongue which is resiliently deformable, and a conductive resin film electrically connecting the slider to the flexure, the conductive resin film has a conduction starting voltage of 2.0 V or less.

9 Claims, 5 Drawing Sheets

MAGNETIC HEAD INCLUDING SLIDER ELECTRICALLY CONNECTED TO FLEXURE WITH CONDUCTIVE RESIN FILM

BACKGROUND OF THE INVENTION

1. Field of the Invention

The present invention relates to floating type magnetic head devices provided for hard disk apparatuses or the like. In particular, the present invention relates to a magnetic head having a slider, and a flexure which supports the slider and which is electrically connected thereto with a conductive resin film.

2. Description of the Related Art

FIG. 4 is a partial side view showing the structure of a conventional magnetic head device for a hard disk apparatus. This magnetic head device is composed of a slider 1, and a supporting member 2 which supports the slider 1.

The slider 1 is formed of a ceramic material or the like. A thin-film element 4 is provided on a trailing end B of the slider 1. The thin-film element 4 includes an MR head (reading head) for reading magnetic signals by detecting a leakage magnetic field, using a magnetoresistance effect, from a recording medium such as a hard disk, and an inductive head (writing head) comprising a coil is formed by patterning.

The supporting member 2 is composed of a load beam 5 and a flexure 6. The load beam 5 is formed of a leaf spring material such as stainless steel, and has a bent section 5a on each side of the front portion thereof so as to have rigidity. A predetermined resilient force can be obtained at the base end of the load beam 5 where the bent section 5a is not formed.

A spherical pivot 7 (which protrudes downward in the figure) is formed in the vicinity of the front portion of the load beam 5, and the slider 1 abuts against the pivot 7 with the flexure 6 provided therebetween. The flexure 6 is formed of a leaf spring such as stainless steel. The flexure 6 includes a fixed section 6a and a tongue 6. A step 6c connects the fixed section 6a to the tongue 6b.

As shown in FIG. 4, the slider 1 is bonded to the lower surface of the tongue 6b with a resin adhesive 20. This resin adhesive 20 is formed of, for example, a thermosetting epoxy resin adhesive. A conductive pattern (not shown in the figure) is provided on the rear side of the tongue 6b. In addition, an electrode terminal section (not shown in the figure), formed of a thin film extending from the thin-film element 4, is provided on the trailing end B of the slider 1. At the junction between this conductive pattern and the electrode terminal section, a joint 9 is formed by ball bonding using gold (Au) or the like. Furthermore, the joint 9 is covered with a reinforcing resin film 10, which provides protection for the joint 9.

A fillet-shaped conductive resin film 21 is formed between the leading end A of the slider 1 and the tongue 6b. This conductive resin film 21 is provided to secure the electrical connection between the slider 1 and the flexure 6, and to dissipate static electricity in the slider 1 to the supporting member 2 side.

The upper surface of the tongue 6b abuts against the pivot 7 provided on the load beam 5. This permits the slider 1 bonded to the lower surface of the tongue 6b to freely change attitude, by means of the resilience of the tongue 6b, with the apex of the pivot 7 serving as a fulcrum.

This conventional magnetic head device is used for a so-called "CSS" (Contact Start Stop) type hard disk apparatus or the like, and when the disk D stops, an air bearing surface (i.e., a floating surface, hereinafter referred to as an ABS) 1a of the slider 1 is brought into contact with a recording surface of the disk D. The slider 1 of the magnetic head device is urged toward a disk D by the resilient force of the base end of the load beam 5. When the disk D starts, an airflow occurs between the slider 1 and the surface of the disk D in the direction of the disk movement, and the slider 1 is lifted above the surface of the disk D by a short distance $\delta 2$ (spacing) because of the lifting force caused by the airflow.

While the slider 1 is lifted (as shown in FIG. 4), the leading end A of the slider 1 is lifted higher above the disk D than the trailing end B. While maintaining this lifting attitude, magnetic signals are either detected from the disk by the MR head of the thin-film element 4, or are written on the disk by the inductive head.

A process for manufacturing the magnetic head device described above generally comprises the steps of bonding the upper surface of the slider 1 to the lower surface of the tongue 6b of the flexure 6 with the resin adhesive 20, electrically connecting an electrode of the flexure 6 to a pad portion of the slider 1 with the joint 9 (such as a gold ball), and inspecting the electrical characteristics of the magnetic head device.

In the step of inspecting the electrical characteristics described above, the inspection is performed under conditions almost identical to actual usage conditions. That is, for example, the ABS (floating surface) 1a of the slider 1 is in contact with the recording surface of the disk D, the disk D is then started, and subsequently, the slider 1 is lifted above the surface of the disk D by a short distance $\delta 2$ (spacing). As a result, the slider 1 may be electrified by friction with the disk D or the like, and a potential difference between the slider 1 and the disk D may be generated.

This problem may also occur in other types of magnetic head devices. For example, in a load/unload type head, a recording medium and the slider are theoretically not brought into contact with each other. However, they are brought into contact with each other under certain conditions (e.g., contacts can occur while the disk rotates), and as a result, a potential difference between the slider and the recording medium may be generated as in the case of the CSS type device.

In the magnetic head described above, it has been generally believed that electrical conduction in the conductive resin film 21 is ensured by dielectric breakdown which occurs between particles of the conductive filler compounded with the resin. Accordingly, the electrical conduction cannot be obtained if a voltage greater than a predetermined threshold value is not applied. That is, electrical conduction between the slider 1 and the flexure 6 cannot be ensured until the voltage applied thereto exceeds the predetermined threshold value.

Consequently, when the threshold value is larger than an electrostatic breakdown voltage in which electrostatic damage to an MR element or the like occurs, electrical conduction between the slider 1 and the flexure 6 cannot be ensured, and when the slider 1 is electrified, the charges therein cannot be dissipated to the supporting member 2 side via the conductive resin film 21. As a result, there has been a problem in that electrostatic breakdown of a thin-film element 4 (such as an MR head) may occur when this electrified slider 1 is brought into contact with metal or the like.

In addition, as shown in FIG. 4, the trailing end B of the slider 1 is rigidly bonded to the tongue 6b of the flexure 6 by the joint 9 formed by ball bonding. Furthermore, as shown in FIG. 4, the conductive resin film 21 is provided between the leading end A of the slider 1 and the tongue 6b of the flexure 6.

However, in conventional magnetic head devices, the flatness of the ABS (floating surface) 1a of the slider 1 can easily vary. In other words, the crown height (which will be described later) easily varies, and hence, it has been very difficult to maintain a constant spacing δ2. The reason the flatness of the ABS 1a of the slider 1 (i.e., the crown height) can easily vary is thought to be because the conventional conductive resin film 21 provided between the slider 1 and the lower surface of the tongue 6a of the flexure 6 contains a rigid resin such as a thermosetting epoxy resin as an adhesive (binder).

In addition, since the slider 1 has a coefficient of thermal expansion different from that of the flexure 6, when the conductive resin film 21 provided between the upper surface of the slider 1 and the lower surface of the tongue 6b is rigid, thermal stress generated by the difference in coefficient of thermal expansion between the tongue 6b and the slider 1 may affect the slider 1. As a result, deformation of the bonding position of the slider 1 can occur because of the influence of the conductive resin film 21.

Since the flexure 6 has a larger coefficient of thermal expansion than the slider 1, the ABS 1a of the slider 1 is deformed in a low temperature region to be convex in relation to the disk D, and the spacing loss is increased, thereby resulting in a decrease in output. In contrast, the ABS 1a of the slider 1 is deformed in a high temperature region to be concave in relation to the disk D. This may result in the trailing end B of the slider 1 colliding with the surface of the disk D, and hence, the minimum floating amount (spacing) cannot be maintained in some cases.

SUMMARY OF THE INVENTION

In consideration of the problems described above, the present invention was made in order to achieve at least the following objects: (1) to prevent the generation of electrostatic breakdown of a magnetic head device; (2) to decrease a conduction starting voltage for electrical conduction of a conductive resin film; (3) to improve electrical conduction properties of the conduction resin film; and (4) to prevent the degradation of floating properties of a slider caused by the formation of the conductive resin film.

A magnetic head of the present invention comprises a slider having a thin-film element which performs at least one of writing and reading; a flexure bonded to the slider and having a tongue which is resiliently deformable; and a conductive resin film which electrically connects the slider to the flexure; wherein the conductive resin film has a conduction starting voltage of 2.0 V or less. Moreover, the conductive resin film preferably has a conduction starting voltage of 1.0 V or less.

According to the present invention, the conductive resin film may comprise a thermoplastic elastomer and conductive filler, and the conductive filler content may be 70 wt % or more. Moreover, the conductive filler content is preferably 80 wt % or more.

In addition, according to the present invention, the conductive resin film described above may have a durometer hardness of less than D-40. Moreover, the conductive resin film preferably has a durometer hardness of less than D-20.

In the present invention, when a voltage of 0.5 V is applied across the slider and the flexure, the resistance is preferably 1 KΩ or less. When a voltage of 0.1 V is applied across the slider and the flexure, the resistance is more preferably 1 KΩ or less.

Furthermore, in the magnetic head of the present invention, a voltage equal to or more than a conduction threshold voltage of the conductive resin film may be applied across the slider and the flexure beforehand. In the step described above, the voltage applied beforehand is approximately 2 to 5 V, and is more preferably approximately 3 to 4 V.

In the magnetic head of the present invention, since the conduction starting voltage at which the slider and the flexure are electrically connected to each other is set to 2.0 V or less, or preferably 1.0 V or less, even when the slider is electrified, the charges can be smoothly dissipated to the flexure at the conduction starting voltage described above, and hence, electrostatic damage to the thin-film element used for writing and/or reading can be prevented.

When a voltage is applied to a conductive resin film composed of a thermoplastic elastomer and conductive filler compounded therewith, and when the voltage exceeds a predetermined threshold value, dielectric breakdown occurs between particles of the conductive filler, and hence, electrical conduction of the conductive resin film can be ensured. In the case described above, the conduction starting voltage means the threshold voltage described above.

In the present invention, as the thermoplastic elastomer, an elastomer primarily composed of, for example, an acrylic-based, a polyurethane-based, a polyester-based, or a nylon-based thermoplastic resin may be used. A silver-based, copper-based, or gold-based filler may be used, for example, as the conductive filler.

In the present invention, when the conduction starting voltage of the conductive resin film is set to more than 2.0 V, a potential difference of 2 V or more is generated between the slider and the medium due to the friction therebetween, and in addition, when the spacing δ1 approaches ten nm, the recording area of the medium may be adversely affected by local discharge generated between the slider and the medium, or electrostatic damage to the thin-film element provided on the slider may easily occur. Accordingly, it is preferable that the conduction starting voltage be set to not more than 2.0 V.

In addition, in the case in which the conduction starting voltage of the conductive resin film is set to more than 1.0 V, and because it is expected that future technical developments will result in a spacing δ1 of 10 nm or less, or that the resistance against static electricity of a thin-film element provided on the slider will decrease, and hence, electrostatic damage cannot be reliably prevented. Accordingly, it is preferable that the conduction starting voltage be set to not more than 1.0 V.

The durometer hardness of the conductive resin film is preferably set to less than D-40 and is more preferably set if to less than D-20. Accordingly, the change in flatness of the ABS (hereinafter referred to as "adhesive deformation"), which occurs when the conductive resin film 11 is formed between the slider and the flexure, can be reduced.

The durometer hardness in the present invention is a value obtained by a measurement method in accordance with JIS-7215 (Japanese Industrial Standards) or the like and is generally used as an index of hardness of a coated resin film. In order to measure the durometer hardness, an indenter of a specified measuring device is pressed on a coated resin film, and the durometer hardness is determined in accordance with the depth to which the indenter enters the coated resin film. A high durometer hardness means a harder and more rigid coated resin film.

When the durometer hardness of the conductive resin film is set to D-40 or more, and when the resin is cooled to room temperature after heat curing, the strain generated due to the difference in coefficient of thermal expansion between the slider and the flexure cannot be absorbed by the deformation or elongation of the conductive resin film, and the strain adversely affects the slider as a thermal stress, thereby changing the flatness of the ABS. Accordingly, it is preferable that the durometer hardness of the conductive resin film be not more than D-40.

In addition, when the durometer hardness of the conductive resin film is set to D-20 or more, because of an anticipated future decrease in the size of the slider (0.3 mm to 0.2 mm), the rigidity of the slider itself is decreased, and hence, the thermal stress described above easily affects the slider, whereby the flatness of the ABS can easily vary. Accordingly, it is preferable that the durometer of the conductive resin film be not more than D-20.

When the durometer hardness of the conductive resin film is set as described above, the strain generated between the slider and the flexure due to the difference in coefficient of thermal expansion therebetween can be absorbed, and in addition, a very flexible conductive resin film can be used to reduce the internal stress generated due to the shrinkage thereof during curing. Accordingly, when one side (trailing side) of the slider is rigidly bonded to the flexure, even though a thermal stress is generated due to the difference in coefficient of thermal expansion between the slider and the flexure, the change in flatness of the ABS (floating surface) of the slider or the change in crown height can be prevented.

In the present invention, it is preferable that the conductive resin film be composed of a thermoplastic elastomer and conductive filler compounded therewith, and that the conductive filler content be set to 70 wt % or more. In addition, the conductive filler content is more preferably set to 80 wt % or more. Accordingly, both the conduction starting voltage (that is the threshold value described above) and the durometer hardness of the conductive resin film can be controlled in the appropriate ranges.

When the conductive filler content is set to less than 70 wt %, the resistance at a measurement voltage of 2.0 V becomes 1 M$\Omega$ or more or infinite, the charges generated in the slider due to the friction with a medium cannot smoothly be dissipated to the flexure, and damage to a recording area of the medium caused by local discharge or electrostatic damage to a thin-film element provided on the slider can easily occur. Accordingly, it is preferable that the conductive filler content be not less than 70 wt %.

In addition, when the conductive filler content is set to less than 80 wt %, since it is expected that the spacing between the slider 1 and the media will be decreased by future technical developments, and that the resistance against static electricity of the thin-film element provided on the slider will decrease, the electrostatic damage described above cannot be reliably prevented. Hence, it is preferable that the conductive filler content be set to not less than 80 wt %.

In the magnetic head of the present invention in which the resistance is set to 1 K$\Omega$ or less at a measurement voltage of 0.5 V applied across the slider and the flexure, even when the slider is electrified due to the friction with a medium, and a potential difference of 0.5 V or more is generated between the slider and the medium, the charges in the slider can be smoothly dissipated to the flexure via the conductive resin film because of the low resistance between the slider and the flexure described above. Hence, electrostatic damage to the thin-film element used for writing and/or reading caused by the electrified slider can be prevented.

In addition, in the magnetic head of the present invention in which the resistance is set to 1 K$\Omega$ or less at a measurement voltage of 0.1 V applied across the slider and the flexure, even when the slider is electrified due to the friction with a medium, and a potential difference of 0.1 V or more is generated between the slider and the medium, the charges in the slider can be smoothly dissipated to the flexure via the conductive resin film because of the low resistance between the slider and the flexure described above. Hence, electrostatic damage to the thin-film element used for writing and/or reading caused by the electrified slider can be prevented.

In order to form a magnetic head in which the resistance is set to 1 K$\Omega$ or less when a voltage of 0.1 to 0.5 V is applied across a slider and a flexure, as described above, first, a magnetic head having a slider provided with a thin-film element for writing and/or reading, a flexure bonded to the slider and having a tongue which can be resiliently deformed, and a conductive resin film electrically connecting the slider to the flexure is prepared. Subsequently, a voltage of approximately 2 to 5 V, which is larger than the threshold voltage, is applied, or a voltage of approximately 3 to 4 V is preferably applied, across the slider and the flexure before the magnetic head is used, whereby a magnetic head having the properties described above can be formed.

Concomitant with the trend toward miniaturization and higher performance of thin-film elements such as MR heads because of increases in magnetic recording density, with the threshold voltage at which the electrostatic breakdown of the thin-film element occurs being further decreased, the magnetic head of the present invention can nevertheless satisfactorily withstand the condition described above, and electrostatic damage to the thin-film element can be reliably prevented.

DESCRIPTION OF THE PREFERRED EMBODIMENTS

Hereinafter, an embodiment of a magnetic head according to the present invention will be described with reference to drawings.

Figure 1:
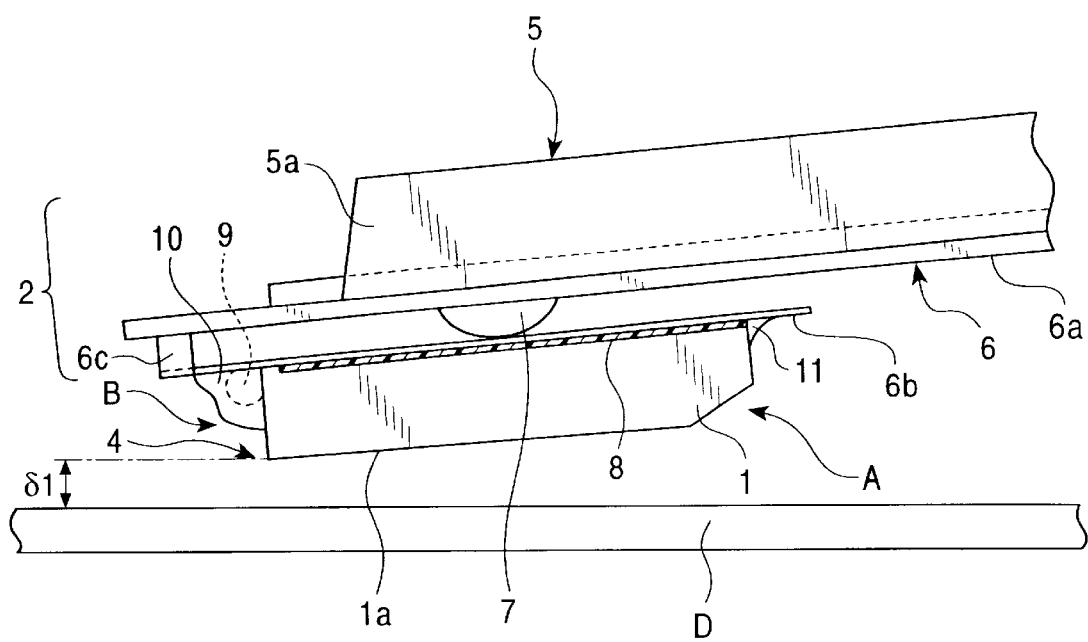
FIG. 1 is a partial side view showing an embodiment of a magnetic head device according to the present invention.
Figure 2:
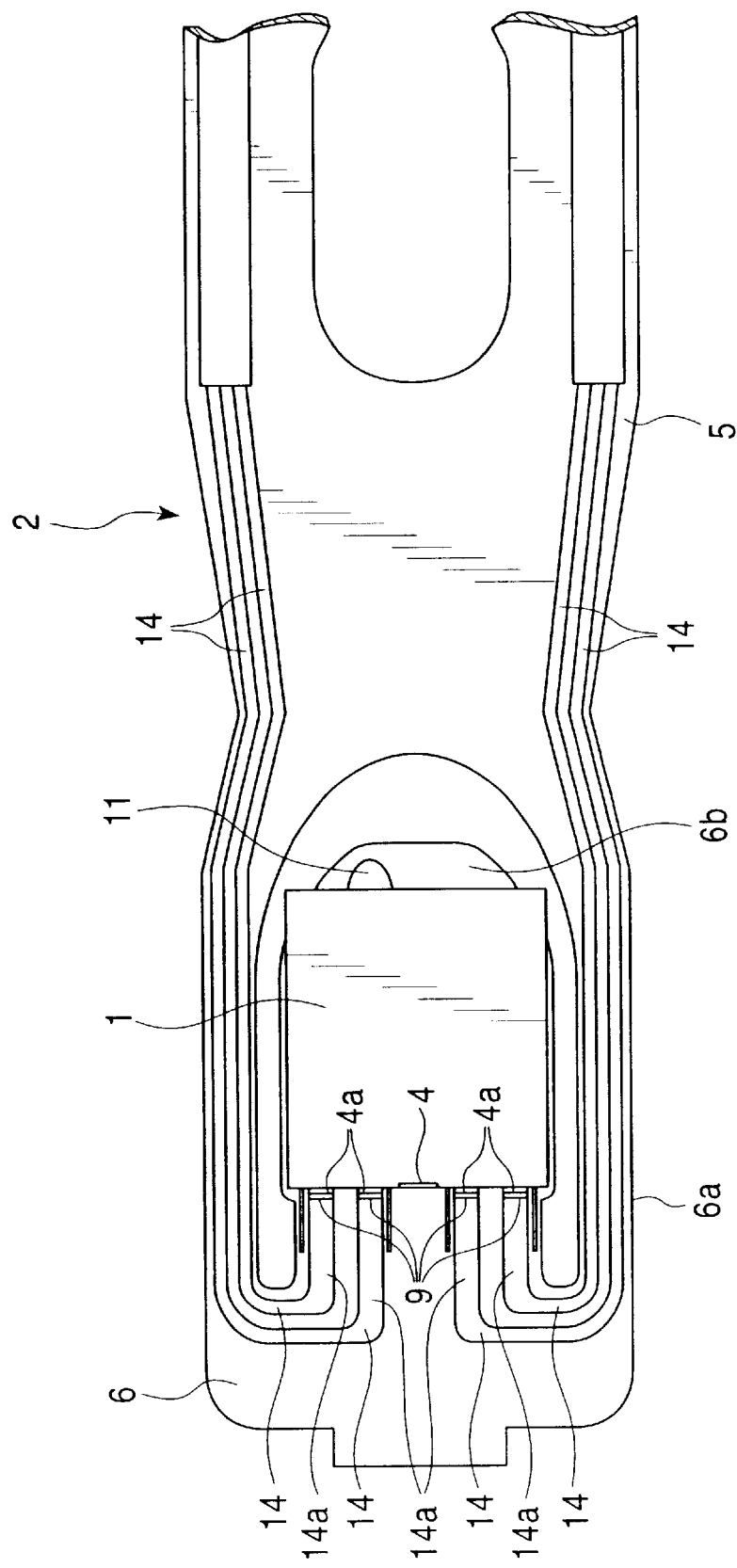
FIG. 2 is a partial plan view showing a front section of the magnetic head device shown in FIG. 1 when it is viewed from the rear side.

FIG. 1 is a partial side view showing a floating type magnetic head device, provided for a hard disk apparatus or the like, according to this embodiment. FIG. 2 is a partial plan view showing a front section of the magnetic head device shown in FIG. 1 when it is viewed from the rear side. This magnetic head device is composed of a slider 1 and a supporting member 2 for supporting the slider 1.

As shown in FIG. 1, the slider 1 is formed of a nonmagnetic ceramic material such as $Al_2O_3$—TiC. A thin-film element 4 formed of a reading head portion and a writing head portion laminated to each other is provided on a trailing end B of the slider 1. In addition, an ABS (floating surface) 1a is formed on the side of the slider 1 opposing a disk D. The thin-film element 4 is formed of a laminate composed of permalloy (an Ni—Fe alloy), which is a magnetic material, and alumina, which is an insulating material. The thin-film element 4 includes a magnetic detecting portion (reading head portion) for reading magnetic signals saved on the disk D and/or a magnetic writing portion (writing head portion) for writing magnetic signals on to the disk D. For example, the magnetic detecting portion can be MR head formed of magnetoresistive element (MR element). In addition, the magnetic writing portion is composed of an inductive head including a patterned coil and core.

The supporting member 2 is composed of a load beam 5 and a flexure 6. The load beam 5 is formed of a leaf spring material such as stainless steel 304, and has a bent section 5a having rigidity formed on each side of the load beam 5. The best section 5a extends from the upper right side in FIG. 1 to the vicinity of the front portion. The bent section 5a extends to approximately the middle portion of the load beam 5, and a leaf spring section (not shown in the figure) which does not have the bent section 5a is formed from the end of the bent section 5a to the base portion of the load beam 5.

A spherical pivot 7 that protrudes downward in the figure is formed on the planar portion between the bent sections 5a of the load beam 5. As will be described later, the apex of the pivot 7 is formed so as to abut against the upper surface of the slider 1 with a tongue 6b of the flexure 6 provided therebetween.

The flexure 6 is formed of a thin leaf spring such as stainless steel 304. This flexure 6 is composed of a fixed section 6a and a tongue 6b. A step 6c connects the fixed section 6a to the tongue 6b. As shown in FIG. 1, the slider 1 is bonded to the lower surface of the tongue 6b with a resin adhesive 8. This resin adhesive 8 preferably has properties similar to those of a conductive resin film 11 (described later) except for the electrical conduction properties.

As shown in FIG. 2, in the front region of the flexure 6, conductive patterns 14 are formed from the fixed section 6a to the tongue 6b of the flexure 6. The widths of the conductive patterns 14 formed on the tongue 6b increase toward the base end of the flexure 6 so as to form connection sections 14a which are connected to the slider 1. On the trailing end B of the slider 1, electrode terminal sections 4a formed of thin films extending from the thin-film element 4 are provided at intervals equal to those of the connections sections 14a.

In this embodiment, the electrode terminal sections 4a provided on the trailing end B of the slider 1 and the connections sections 14a provided on the flexure 6 are rigidly bonded together by joints 9 formed of gold (Au) or the like by ball bonding. In addition, as shown in FIG. 1, the joints 9 are covered with a reinforcing resin film 10 for protection. The reinforcing resin film 10 is not shown in FIG. 2.

As shown in FIGS. 1 and 2, a fillet-shaped conductive resin film 11 is formed from the leading end A of the slider 1 to the tongue 6b of the flexure 6. This conductive resin film 11 is provided so that electrical conduction between the slider 1 and the flexure 6 is ensured.

Because the trailing end B of the slider 1 is rigidly bonded to the tongue 6b of the flexure 6 by the joints 9 (formed of Au or the like by ball bonding), as described above, and since the slider 1 has a coefficient of thermal expansion different from that of the flexure 6, the material used for bonding the slider 1 to the tongue 6b must be flexible enough to be able to absorb (buffer) the strain ($\epsilon$) generated by the difference in coefficient of thermal expansion between the slider 1 and the flexure 6 and to be able to reduce an internal stress generated by the shrinkage of the material during curing.

Accordingly, in the preferred embodiment, a thermoplastic elastomer having flexibility which is primarily composed of an acrylic, a polyurethane, a polyester, a nylon resin, or the like, and which is compounded with a conductive filler, may be selected for a conductive resin film 11.

In addition, a silver-based filler, a copper-based filler, a gold-based filler, or the like may be used as the conductive filler.

In this embodiment, the durometer hardness of the conductive resin film 11 is preferably set to less than D-40, and is more preferably set to less than D-20.

When the durometer hardness of the conductive resin film 11 is set to D-40 or more, the strain generated by the difference in coefficient of thermal expansion between the slider 1 and the flexure 6 while the resin is cooled to room temperature after heat curing cannot be absorbed by deformation and elongation of the conductive resin film 11. This strain affects the slider 1 as a thermal stress, and as a result, the flatness of the ABS 1a is altered. Accordingly, the durometer hardness is preferably set to D-40 or less.

In addition, when the durometer hardness of the conductive resin film 11 is set to D-20 or more, the rigidity of the slider 1 itself will be decreased by a further decrease in size of the slider (0.3 mm to 0.2 mm), which is anticipated to occur in future developments, and the thermal stress described above easily affects the slider 1. As a result, the flatness of the ABS 1a is easily altered. Accordingly, the durometer hardness is more preferably set to D-20 or less.

When the durometer hardness of the conductive resin film 11 is less than D-40, the adhesive deformation of the slider 1 which occurs during the formation of the conductive resin film 11 can be reduced. In particular, when the conductive resin film 11 is formed, the ABS 1a of the slider 1 is deformed so as to be convex in relation to the disk D, and the distance from the top of the convex mentioned above to the flat surface or to a crown-shaped ABS 1a before deformation is defined as the change in crown height (which is the adhesive deformation). The change in crown height can be decreased to, for example, 2 nm or less. In addition, when the durometer hardness is less than D-20, the change in crown height can be decreased to, for example, less than 2 nm.

Accordingly, the change of the floating amount $\delta 1$ (see FIG. 1) caused by temperature variation can be decreased to the absolute value of approximately 2 nm or less. As a result, a conventional problem of the trailing end B of the slider 1 colliding with the disk D, or the output being decreased with an increase in floating amount $\delta 1$ (spacing loss), may be eliminated.

In this embodiment, the conductive resin film 11 is formed of a thermoplastic elastomer and conductive filler compounded therewith, in which the conductive filler content is preferably set to 70 wt % or more, and is more preferably set to 80 wt % or more. Accordingly, the durometer hardness of the conductive resin film 11 can be controlled in the preferable range described above.

In the case in which the conductive filler content is set to less than 70 wt %, the resistance of the conductive resin film 11 at a measurement voltage of 2.0 V is 1 MΩ or more, or becomes infinite, and the charges generated in the slider 1 by friction with the medium D cannot be smoothly dissipated to the flexure 6. Accordingly, setting the filler content to less then 70 wt % is not preferable since the recording area of the media D is adversely affected by local discharge, and since electrostatic damage to the thin-film element 4 provided on the slider 1 can easily occur.

In addition, in the case in which the conductive filler content is set to less than 80 wt %, since it is expected that the spacing δ1 between the slider 1 and the media D will be decreased by further technical development in the near future, and that the resistance against static electricity of the thin-film element provided on the slider 1 will therefore decrease, the electrostatic damage described above cannot be reliably prevented. Accordingly, it is more preferable that the conductive filler content be set to not less than 80 wt %.

Furthermore, when the conductive filler content on a weight percent basis in the conductive resin film 11 is set as described above, the conduction starting voltage that can ensure electrical conduction of the conductive resin film 11, which is obtained by dielectric breakdown that occurs between particles of the conductive filler compounded with a resin (a thermoplastic elastomer), can be set to 2.0 V or less, and can be more preferably set to 1.0 V or less.

Accordingly, the conduction starting voltage can be decreased smaller than the limiting voltage of electrostatic breakdown at which electrostatic damage (ESD) to the thin-film element 4 (such as an MR element) occurs, electrical conduction between the slider 1 and the flexure 6 can be ensured, and hence, when the slider 1 is electrified, the charges thereof can be dissipated to the supporting member 2 side via the conductive resin film 11. Consequently, electrostatic damage to the thin-film element 4 (such as an MR head) can be prevented when this electrified slider 1 is brought into contact with metal or the like.

Hereinafter, the conduction starting voltage will be described.

Figure 3:
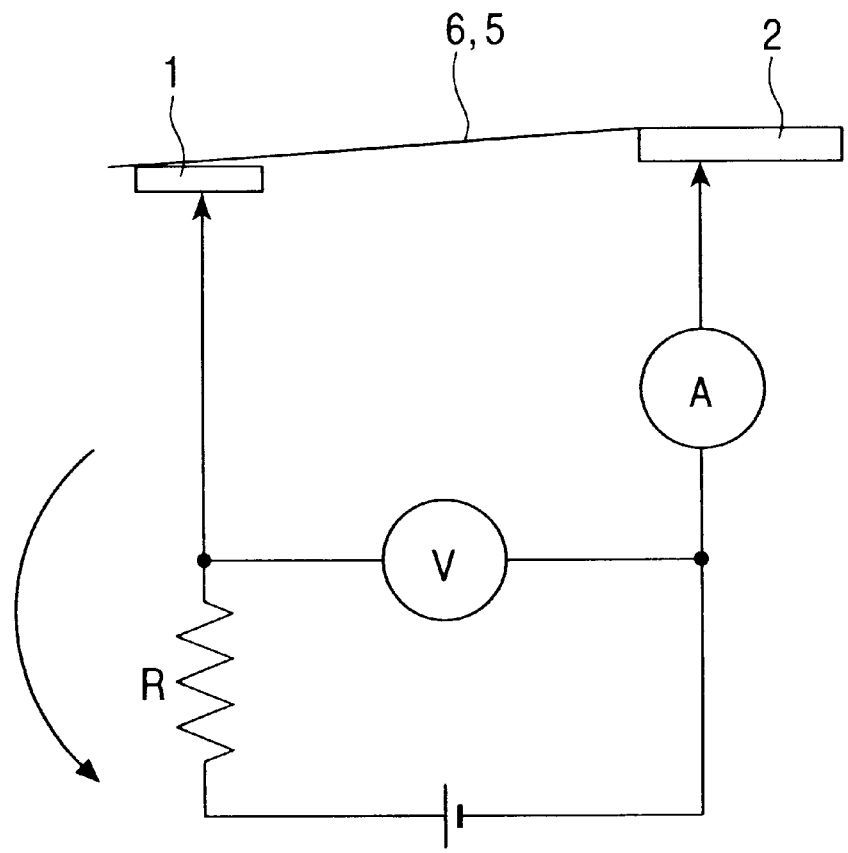
FIG. 3 is a schematic diagram for measuring the relationship between the resistance and the conduction starting voltage according to an embodiment of the present invention.
Figure 4:
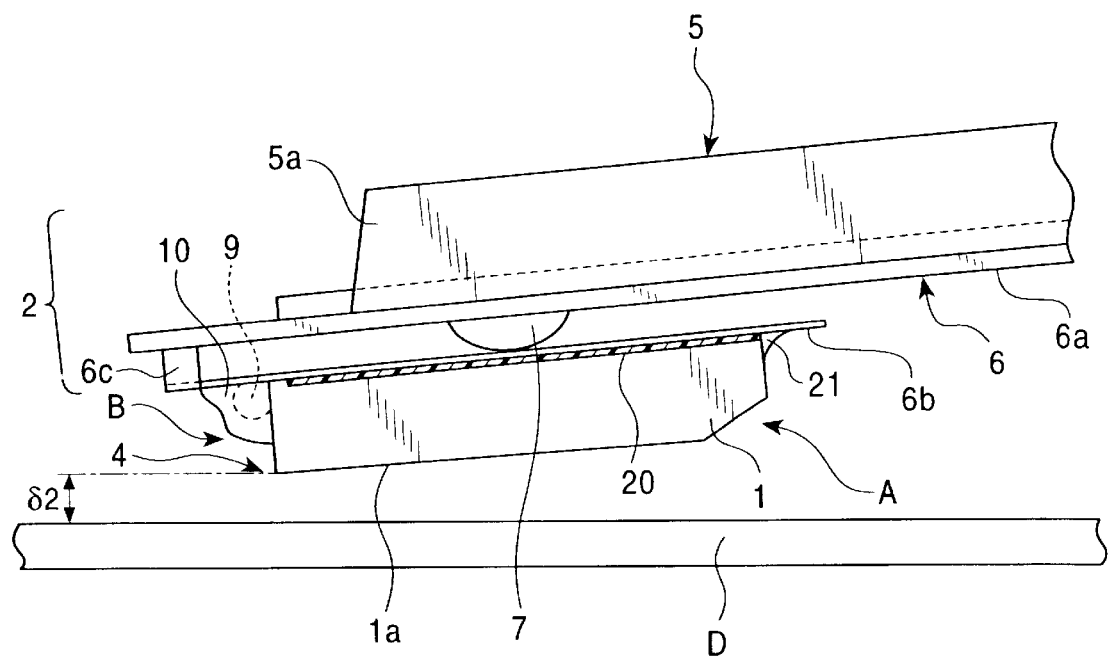
FIG. 4 is a side view showing a conventional magnetic head device.

FIG. 3 is a schematic diagram for measuring the relationship between the resistance and the conduction starting voltage according to this embodiment.

As shown in FIG. 3, the conduction starting voltage of this embodiment is determined by measuring the electrical conduction properties between the slider 1 and the supporting member 2 of a magnetic head device.

In this measurement, after a probe is brought into contact with a surface of a slider 1 composed of $Al_2O_3$—TiC, and a probe is brought into contact with the load beam 5 of the supporting member 2 or with a mounting plate connected to the load beam 5, the resistance between the probes is measured. When the slider is covered with a carbon coating or the like, it is preferable that the probe be brought into direct contact with the surface of the $Al_2O_3$—TiC after the coating film is removed.

Next, the resistance is continuously measured while an applied voltage is gradually increased. The voltage at which the resistance becomes less than 1 MΩ ($10^6$Ω) is defined as the minimum conduction starting voltage (the threshold voltage).

In this measurement, the reason the standard of the resistance is set to 1 MΩ is that a resistance of approximately 10 MΩ can be reliably measured by a general ohm meter, and in addition, it is believed that a conductor having a resistance of approximately 1 MΩ can easily dissipate charges generated by friction, whereby a resistance of 1 MΩ is set to the standard at which the electrical conduction is obtained.

The magnetic head described in detail according to this embodiment is used for, by way of example, a CSS type hard disk apparatus (magnetic writing/reading apparatus). When the disk stops, the slider 1 is resiliently pressed on the surface of the disk D by the resilient force of the leaf spring section of the base portion of the load beam (See FIG. 1) 5. That is, the ABS 1a of the slider 1 is brought into contact with the surface of the disk D. When the disk D starts to rotate, the entire slider 1 is lifted above the surface of the disk D by a short distance δ1 (as shown in FIG. 1) by the airflow which occurs between the slider 1 and the disk D, so that the leading end A floats higher above the surface of the disk D than the trailing end B. Alternatively, only the leading end A floats above the surface of the disk and the trailing end B is continuously or intermittently in contact with the surface of the disk D and is slid thereon.

In a process for manufacturing a magnetic head, inspection of the electrical properties or the like is performed using a testing disk D for checking the operation. During this inspection step, magnetic heads are placed under conditions nearly identical to actual usage conditions. For example, the ABS (floating surface) 1a of the slider 1 is in contact with the recording surface of the disk D, the disk D is then started, and subsequently, the slider 1 is lifted above the surface of the disk D by a short distance δ1 (spacing).

As described above, in this embodiment, since a flexible conductive resin film 11 is provided at the conduction joint portion between the slider 1 and the tongue 6b of the flexure 6, part of the strain (ε) generated between the slider 1 and the tongue 6b can be absorbed (buffered), and the thermal stress (δ) which affects the slider 1 can be reduced, whereby the adhesive deformation of the slider 1 can be reduced. In particular, when the conductive filler content is 70 wt % or more, or is preferably 80 wt % or more, the durometer hardness of the conductive resin film 11 can be set to less than D-40, or can be preferably set to less than D-20. In addition, the conduction starting voltage of the conductive resin film 11 can be decreased to 2.0 V or less, or can be preferably decreased to 1.0 V or less.

Accordingly, the strain generated between the slider 1 and the flexure 6 due to the formation of the conductive resin film 11 can be reduced, and even when the slider is electrified in the inspection process for checking the operation or the like, the charges can be dissipated to the flexure 6 by applying the conduction starting voltage described above. Thus, electrostatic damage to the thin-film element 4, which occurs when the slider 1 is electrified and the charges are not dissipated to the flexure 6, can be prevented.

EXAMPLES

Examples of the present invention will hereinafter be described.

Example 1

In example 1, a polyester-based thermoplastic resin compounded with silver-based conductive filler was prepared as a conductive resin film 11 used in a magnetic head having the structure described above. In this example, the conductive filler content was set to 84 wt %.

Comparative Example 1

In comparative example 1, an epoxy-based thermosetting resin was prepared as a conductive resin film 11 used in a magnetic head having the same structure as that used in example 1. In this comparative example, the conductive filler content was set to 70 wt %.

Comparative Example 2

In comparative example 2, the same magnetic head as that used in comparative example 1 was prepared except that the conductive filler content was set to 82 wt %.

The hardnesses of the conductive resin films used in example 1 and comparative examples 1 and 2 were measured.

In addition, in example 1 and comparative examples 1 and 2, after the slider of the magnetic head and the flexure were bonded to each other, the change (adhesive deformation) in crown height of the ABS (floating surface) of the slider was measured before and after the formation of the conductive resin film 11 (before and after curing operation).

The distance from a standard line, which is a line between the leading edge and the trailing edge of the slider, to the apex of an ABS 1a, which is assumed to be a part of a spheric form, corresponding to the standard line described above was measured, and the average of the distances thus measured in the width direction of the slider was defined as the crown height (when the ABS was convex, the crown height was represented by a positive value).

In addition, in the case in which the ABS 1a of the slider 1 was deformed to be convex in relation to the disk D, the distance from the apex of the convex form described above to the crown-shaped ABS 1a before deformation was defined as the change in crown height.

The results are shown in Table 1. The resin hardness is represented by the durometer hardness.

TABLE 1

|  | Comparative Example 2 | Comparative Example 1 | Example 1 |
|---|---|---|---|
| Type of Resin | Epoxy | Epoxy | Polyester |
| Conductive Filler | Silver-Based Filler | Silver-Based Filler | Silver-Based Filler |
| Filler Content | 82 wt % | 70 wt % | 84 wt % |
| Resin Hardness | D-90 | D-40 | (D-20) |
| Change in Crown Height | +12 nm | +2 nm | +2 nm |

According to the results shown in Table 1, it was found that the hardness of the conductive resin film 11 formed of the polyester-based thermoplastic resin was lower than that of the conductive resin film 11 formed of the epoxy-based thermosetting resin. In addition, it was also found that, between the epoxy-based resins, a resin having a higher silver-based filler content had a higher resin hardness. Furthermore, it was also found that a conductive resin film having lower durometer hardness had a smaller change (adhesive deformation) in crown height.

Next, as shown in FIG. 3, the resistances between the slider 1 and the supporting member 2 were measured for example 1 and comparative examples 1 and 2.

After a probe was brought into contact with a surface of a slider 1 composed of $Al_2O_3$—TiC, and another probe was brought into contact with the load beam 5 of the supporting member 2 or the mounting plate connected to the load beam 5, the resistance was measured at a measurement voltage in the range of from 0.5 V to 7.0 V.

The results are shown in Table 2. In Table 2, the individual resistances are the maximum measured values. In addition, OL in the Table 2 means out of the range, that is, the OL means that the resistance could not be measured since it was 50 MΩ or more.

TABLE 2

| | Resistance (Ω) | | |
|---|---|---|---|
| Measurement Voltage (V) | Comparative Example 2 | Comparative Example 1 | Example 1 |
| 0.5 | OL | OL | 5 M |
| 1.0 | OL | OL | 500 K |
| 2.0 | 13 M | OL | 100 |
| 3.0 | 70 | 500 | 90 |
| 4.0 | 40 | 300 | 90 |
| 5.0 | 40 | 150 | 70 |
| 7.0 | 30 | 100 | 50 |

According to the results shown in Table 2, it was found that, with an increase in measurement voltage, the resistance in example 1 was lower than 1 MΩ at a measurement voltage of 1.0 V. On the other hand, the resistances in comparative examples 1 and 2 were not lower than 1.0 MΩ until the measurement voltage was at least 3.0 V. That is, the conduction starting voltage of the conductive resin film in example 1 was 1.0 V or less, and the conduction starting voltage in comparative example 1 was at least 2.0 V.

Next, conductive resin films containing 78 and 71 wt % of conductive filler, respectively, were prepared as samples of examples 2 and 3 in a manner equivalent to that of example 1. In addition, as samples of comparative examples 3 to 8, conductive resin films containing 67, 63, 58, 51, 45, and 31 wt % of conductive filler, respectively, were also prepared in a manner equivalent to that in example 1.

As shown in FIG. 3, the resistances between the slider 1 and the supporting member 2 in examples 2 and 3 and comparative examples 3 to 8 were measured at measurement voltages of 2.0 and 5.0 V.

The results are shown in Table 3. In this table, a resistance of 50 MΩ means that the resistance was substantially infinite.

TABLE 3

| | | Resistance (Ω) Measurement Voltage (V) | |
|---|---|---|---|
| | Filler Content (wt %) | 2.0 | 5.0 |
| Example 1 | 84 | 100 | 70 |
| Example 2 | 78 | 400 K | 100 |
| Example 3 | 71 | 800 K | 100 |
| Comparative Example 3 | 67 | 1.3 M | 100 |
| Comparative Example 4 | 63 | 10 M | 150 |
| Comparative Example 5 | 58 | 20 M | 150 |
| Comparative Example 6 | 51 | 50 M | 350 |
| Comparative Example 7 | 45 | 50 M | 50 M |
| Comparative Example 8 | 31 | 50 M | 50 M |

According to the results shown in Table 3, it was found that the resistance was increased with a decrease in filler content and that the resistance was 1 MΩ or less at a measurement voltage of 5.0 V when the filler content was 51 wt % or more. However, it was also found that when the measurement voltage was 2.0 V, the resistance was more than 1 MΩ at a filler content of 67 wt %.

That is, in examples 1 to 3, it was found that when the filler content was 71 wt % or more, the conduction starting voltage of the conductive resin film was 2.0 V or less.

According to the results described above, when the conductive resin film is formed of a polyester-based thermoplastic elastomer and silver-based filler, and the silver-based filler content is set to 70 wt % or more, the conduction starting voltage of the conductive resin film can be set to 2.0 V or less, and in addition, the durometer hardness thereof can be set to less than D-40. Consequently, the strain between the slider and the flexure caused by the formation of the conductive resin film can be reduced. In addition, even when the slider is electrified in an inspection step for checking the operation or the like, since the charges can be dissipated to the flexure at the conduction starting voltage described above, electrostatic damage to a thin-film element such as an MR head caused by this electrified slider can be prevented.

In addition, when the silver-based filler content in the conductive resin film composed of a polyester-based thermoplastic elastomer is set to 80 wt % or more, the conduction starting voltage of the conductive resin film can be set to 1.0 V or less, and in addition, the durometer hardness thereof can be set to less than D-20. Consequently, the strain between the slider and the flexure caused by the formation of the conductive resin film can be further reduced. In addition, even when the slider is electrified in an inspection step for checking the operation or the like, since the charges can be dissipated to the flexure at the conduction starting voltage described above, electrostatic damage to a thin-film element such as an MR head caused by this electrified slider can be further effectively prevented. In addition, concomitant with the trend toward miniaturization and higher performance of thin-film elements such as MR heads because of increases in magnetic recording density, even when the threshold voltage at which the electrostatic breakdown of the thin-film element occurs decreases further, the magnetic head described above can satisfactorily withstand the condition described above, and electrostatic damage to the thin-film element can be further reliably prevented.

Experimental Example 1

Next, conductive resin films containing silver-based filler at contents in the range of 30.9 to 84.0 wt % were prepared as samples in a manner equivalent to that in example 1.

Figure 5:
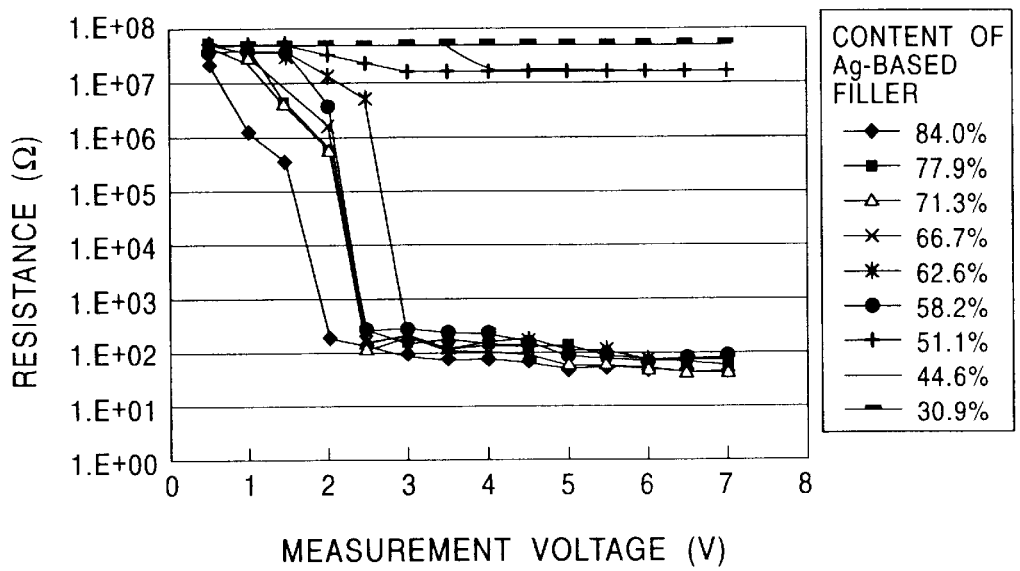
FIG. 5 is a graph showing the relationship between the measurement voltage and the average resistance when the conductive filler content in a conductive resin film is changed.
Figure 6:
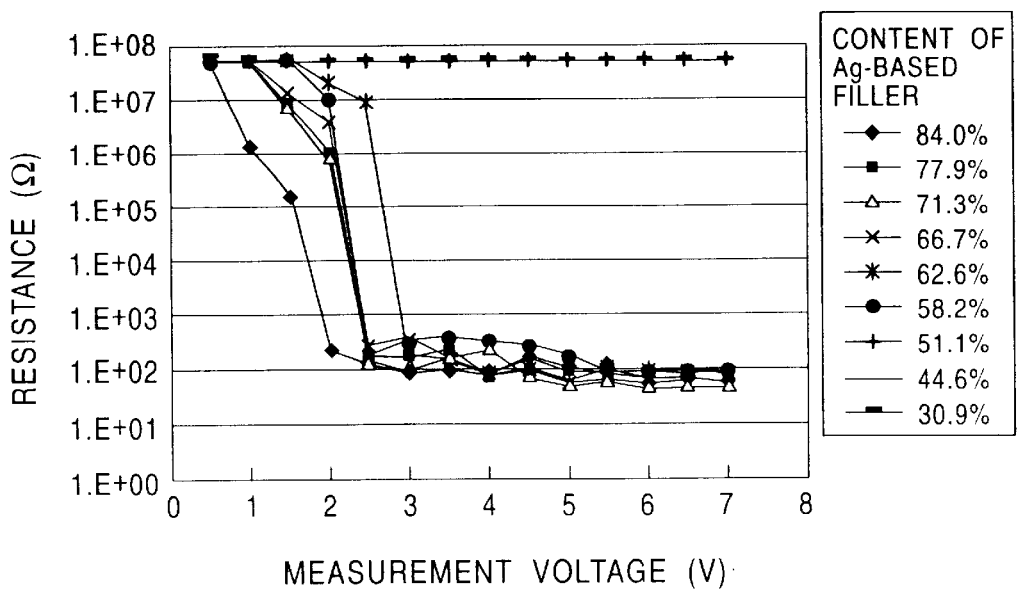
FIG. 6 is graph showing the relationship between the measurement voltage and the maximum resistance when the conductive filler content in a conductive resin film is changed.

As shown in FIG. 3, measurement voltages in the range of 0.5 to 7.0 V were applied across the slider 1 and the supporting member 2 of each sample described above, and the resistances were measured. The results are shown in Tables 4 and 5 and FIGS. 5 and 6. The average values are shown in Table 4 and FIG. 5, and the maximum values are shown in Table 5 and FIG. 6. In these tables and figures, $5 \times 10^7 \Omega$ (50 MΩ) means substantially infinite.

TABLE 4

Average Value

Resistance (Ω)
Silver-Based Filler Content (wt %)

| Voltage (V) | 84.0 | 77.9 | 71.3 | 66.7 | 62.6 | 58.2 | 51.1 | 44.6 | 30.9 |
|---|---|---|---|---|---|---|---|---|---|
| 0.5 | $2 \times 10^7$ | $5 \times 10^7$ | $5 \times 10^7$ | $5 \times 10^7$ | $5 \times 10^7$ | 34,166,667 | $5 \times 10^7$ | $5 \times 10^7$ | $5 \times 10^7$ |
| 1 | 1,365,079 | 19,166,667 | 23,333,333 | 36,666,667 | 36,666,667 | 33,888,889 | $5 \times 10^7$ | $5 \times 10^7$ | $5 \times 10^7$ |
| 1.5 | 330,556 | 3,357,143 | 5,714,286 | 7,380,952 | 34,333,333 | 33,583,333 | $5 \times 10^7$ | $5 \times 10^7$ | $5 \times 10^7$ |
| 2 | 185 | 466,744 | 600,058 | 1,777,884 | 13,333,438 | 3,333,546 | $4 \times 10^7$ | $5 \times 10^7$ | $5 \times 10^7$ |
| 2.5 | 131 | 215 | 158 | 228 | 4,861,197 | 265 | 25,000,070 | $5 \times 10^7$ | $5 \times 10^7$ |
| 3 | 92 | 119 | 183 | 222 | 196 | 264 | 16,667,044 | $5 \times 10^7$ | $5 \times 10^7$ |
| 3.5 | 85 | 153 | 128 | 104 | 195 | 268 | 16,666,917 | $5 \times 10^7$ | $5 \times 10^7$ |
| 4 | 76 | 87 | 139 | 118 | 162 | 208 | 16,666,765 | 16,666,948 | $5 \times 10^7$ |
| 4.5 | 58 | 129 | 109 | 87 | 153 | 136 | 16,666,808 | 16,666,877 | $5 \times 10^7$ |
| 5 | 58 | 129 | 69 | 87 | 106 | 110 | 16,666,818 | 16,666,771 | $5 \times 10^7$ |
| 5.5 | 50 | 71 | 68 | 73 | 99 | 72 | 16,666,738 | 16,666,794 | $5 \times 10^7$ |
| 6 | 47 | 74 | 56 | 73 | 82 | 67 | 16,666,744 | 16,666,735 | $5 \times 10^7$ |
| 6.5 | 44 | 70 | 49 | 53 | 63 | 73 | 16,666,730 | 16,666,707 | $5 \times 10^7$ |
| 7 | 41 | 48 | 43 | 54 | 54 | 74 | 16,666,714 | 16,666,718 | $5 \times 10^7$ |

TABLE 5

Maximum Value

Resistance (Ω)
Silver-Based Filler Content (wt %)

| Voltage (V) | 84.0 | 77.9 | 71.3 | 66.7 | 62.6 | 58.2 | 51.1 | 44.6 | 30.9 |
|---|---|---|---|---|---|---|---|---|---|
| 0.5 | $5 \times 10^7$ | $5 \times 10^7$ | $5 \times 10^7$ | $5 \times 10^7$ | $5 \times 10^7$ | $5 \times 10^7$ | $5 \times 10^7$ | $5 \times 10^7$ | $5 \times 10^7$ |
| 1 | 1,428,571 | $5 \times 10^7$ | $5 \times 10^7$ | $5 \times 10^7$ | $5 \times 10^7$ | $5 \times 10^7$ | $5 \times 10^7$ | $5 \times 10^7$ | $5 \times 10^7$ |
| 1.5 | 166,677 | $7.5 \times 10^6$ | $7.5 \times 10^6$ | $1.5 \times 10^7$ | $5 \times 10^7$ | $5 \times 10^7$ | $5 \times 10^7$ | $5 \times 10^7$ | $5 \times 10^7$ |
| 2 | 208 | $1 \times 10^6$ | $8 \times 10^5$ | $4 \times 10^6$ | $2 \times 10^7$ | $1 \times 10^7$ | $5 \times 10^7$ | $5 \times 10^7$ | $5 \times 10^7$ |
| 2.5 | 117 | 150 | 108 | 257 | 8,333,333 | 127 | $5 \times 10^7$ | $5 \times 10^7$ | $5 \times 10^7$ |
| 3 | 88 | 150 | 107 | 400 | 88 | 314 | $5 \times 10^7$ | $5 \times 10^7$ | $5 \times 10^7$ |
| 3.5 | 75 | 218 | 133 | 84 | 106 | 371 | $5 \times 10^7$ | $5 \times 10^7$ | $5 \times 10^7$ |
| 4 | 67 | 82 | 156 | 82 | 82 | 300 | $5 \times 10^7$ | $5 \times 10^7$ | $5 \times 10^7$ |
| 4.5 | 59 | 144 | 55 | 73 | 96 | 246 | $5 \times 10^7$ | $5 \times 10^7$ | $5 \times 10^7$ |
| 5 | 61 | 133 | 52 | 67 | 100 | 150 | $5 \times 10^7$ | $5 \times 10^7$ | $5 \times 10^7$ |
| 5.5 | 44 | 100 | 50 | 57 | 104 | 64 | $5 \times 10^7$ | $5 \times 10^7$ | $5 \times 10^7$ |
| 6 | 45 | 90 | 50 | 67 | 94 | 51 | $5 \times 10^7$ | $5 \times 10^7$ | $5 \times 10^7$ |

TABLE 5-continued

Maximum Value

| Voltage (V) | Resistance (Ω) Silver-Based Filler Content (wt %) | | | | | | | |
|---|---|---|---|---|---|---|---|---|
| | 84.0 | 77.9 | 71.3 | 66.7 | 62.6 | 58.2 | 51.1 | 44.6 | 30.9 |
| 6.5 | 40 | 83 | 43 | 53 | 61 | 72 | $5 \times 10^7$ | $5 \times 10^7$ | $5 \times 10^7$ |
| 7 | 39 | 51 | 43 | 53 | 59 | 75 | $5 \times 10^7$ | $5 \times 10^7$ | $5 \times 10^7$ |

From the results shown in Tables 4 and 5, it was found that the resistance was decreased when the filler content was increased, and that at a measurement voltage of 2.0 V, the resistance was 1 MΩ or less when the filler content was in the range of 71.3 to 84 wt %, but was more than 1 MΩ when the filler content was 66.7 wt % or less. In addition, at a measurement voltage of 1.5 V, it was found that the resistance was 1 MΩ or less when the filler content was 84 wt %, but was more than 1 MΩ when the filler content was 77.9 wt % or less. When the measurement voltage was 0.5 to 1.0 V, it was found that the resistance was more than 1 MΩ even though the filler content is high.

That is, it was found that the conduction starting voltage of the conductive resin film was in the range of 1.5 to 2.0 V when the filler content was 71.3 wt % or more.

Experimental Example 2

As a conductive resin film 11 used in a magnetic head having the structure described above, a sample composed of a polyester-based thermoplastic resin and silver-based conductive filler compounded therewith was prepared. The conductive filler content in the resin was set to 84 wt %. In addition, as shown in FIG. 3, a voltage of 4.0 V, which was larger than a threshold voltage, was applied across the slider 1 and the supporting member 2 beforehand.

Next, after the voltage larger than the threshold voltage was applied as described above (after the breakdown occurred), as shown in FIG. 3, the resistance between the slider 1 and the supporting member 2 was measured at a measurement voltage of 100 mV (0.1 V). This threshold voltage changed electrical conduction properties of the conductive resin film and was the minimum voltage that decreased the conduction stating voltage. The results are shown in Table 6.

In addition, the sample to which the voltage larger than the threshold voltage was applied beforehand was treated by a thermal shock test for 50 cycles. In each cycle the sample was placed at −40° C. for 30 minutes and was then placed at 85° C. for 30 minutes. Subsequently, as shown in FIG. 3, the resistances between the slider 1 and the supporting member 2 were measured at a measurement voltage in the range of 100 mV (0.1 V) to 500 mV (0.5 V). The results are shown in Tables 7 and 8.

TABLE 6

After Breakdown

| Measurement Voltage (mV) | Measurement Current (mA) | Resistance (Ω) |
|---|---|---|
| 100 | 0.39 | 256 |
| 100 | 0.225 | 444 |
| 100 | 0.46 | 217 |

TABLE 6-continued

After Breakdown

| Measurement Voltage (mV) | Measurement Current (mA) | Resistance (Ω) |
|---|---|---|
| 100 | 0.335 | 299 |
| 100 | 0.82 | 122 |
| 100 | 0.263 | 380 |
| 100 | 0.582 | 172 |
| 100 | 0.385 | 260 |
| 100 | 1.2 | 83 |
| 100 | 0.32 | 313 |
| 100 | 0.826 | 121 |
| 100 | 0.56 | 179 |
| 100 | 0.39 | 256 |
| 100 | 0.847 | 118 |
| 100 | 0.432 | 231 |
| Average Value | | 230 |
| Maximum Value | 100 | 1.2 | 444 |
| Minimum Value | | | 83 |

TABLE 7

After Heat Shock Test

| Measurement Voltage (mV) | Measurement Current (mA) | Resistance (Ω) |
|---|---|---|
| 100 | 0.275 | 364 |
| 100 | 0.131 | 763 |
| 100 | 0.239 | 418 |
| 100 | 0.195 | 513 |
| 100 | 0.227 | 441 |
| 100 | 0.165 | 606 |
| 100 | 0.386 | 259 |
| 100 | 0.23 | 435 |
| 100 | 0.184 | 543 |
| 100 | 0.184 | 543 |
| 100 | 0.257 | 389 |
| 100 | 0.286 | 350 |
| 100 | 0.227 | 441 |
| 100 | 0.212 | 472 |
| 100 | 0.164 | 610 |
| Average Value | | 476 |
| Maximum Value | 100 | 0.386 | 763 |
| Minimum Value | | | 259 |

TABLE 8

After Heat Shock Test

| Measurement Voltage (mV) | Measurement Current (mA) | Resistance (Ω) |
|---|---|---|
| 500 | 1.58 | 316 |
| 500 | 0.918 | 545 |
| 500 | 1.74 | 287 |
| 500 | 1.12 | 446 |
| 500 | 1.33 | 376 |
| 500 | 1.13 | 442 |
| 500 | 2.25 | 222 |

TABLE 8-continued

After Heat Shock Test

| Measurement Voltage (mV) | Measurement Current (mA) | Resistance (Ω) |
|---|---|---|
| 500 | 1.44 | 347 |
| 500 | 0.93 | 538 |
| 500 | 1.1 | 455 |
| 500 | 1.57 | 318 |
| 500 | 1.8 | 278 |
| 500 | 1.3 | 385 |
| 500 | 1.41 | 355 |
| 500 | 1.12 | 446 |
| Average Value |  | 384 |
| Maximum Value | 500 | 2.25 | 545 |
| Minimum Value |  | 222 |

From the results shown in Table 6, it was found that the sample to which the threshold voltage was applied beforehand had a resistance of 444Ω or less when a voltage of 0.1 V was applied across the slider 1 and the supporting member 2 (between the slider and the flexure).

In addition, as shown in Tables 7 and 8, it was found that after the thermal shock test described above was performed, the sample to which the threshold voltage was applied beforehand had a resistance of 763Ω or less when a voltage of 0.1 V was applied across the slider 1 and the supporting member 2 (between the slider and the flexure), and had a resistance of 545Ω or less when a voltage of 0.5 V was applied.

In a magnetic head in which the slider and the flexure are electrically connected to each other with the conductive resin film, the slider may be electrified by the friction with a media while the magnetic head is used, and hence, a potential difference of 0.1 V or more may be generated between the slider and the flexure. However, when a voltage larger than the threshold voltage is applied across the slider and the flexure before the magnetic head is used or while it is manufactured, the resistance therebetween is further decreased as described above, and as a result, the charges in the slider can be easily dissipated to the flexure via the conductive resin film. Consequently, the electrostatic damage to a thin-film element used for writing and/or reading caused by the electrified slider can be prevented. It is believed that this is because, since a voltage larger than the threshold voltage is applied beforehand, the breakdown occurs between particles of the conductive filler, and hence, electrical conduction of the conductive resin film can be ensured.

According to the magnetic head of the present invention, the following advantages can be obtained.

(1) Since the conduction starting voltage of the conductive resin film which electrically connects the slider to the flexure is set to 2.0 V or less, and is preferably set to 1.0 V or less, even when the slider is electrified, the charged can be dissipated to the flexure at the conduction starting voltage described above, and hence, electrostatic breakdown of a thin-film element used for writing and/or reading caused by the electrified slider can be prevented.

(2) Since the durometer hardness of the conductive resin film described above is set to less than D-40, and or is preferably set to less than D-20, the change in crown height, that is, the adhesive deformation, during the formation of the conductive resin film between the slider and the flexure can be reduced. In the magnetic head, a thermal stress is typically generated by the difference in coefficient of thermal expansion between the slider and the flexure since one side of the slider (trailing side) is rigidly bonded to the flexure, and hence, the change in flatness of the ABS (floating surface) of the slider, that is, the change in crown height may occur. However, according to the conductive resin film described above, the change in crown height can be prevented, and as a result, the degradation of the floating properties of the slider can be prevented.

(3) Since the conductive filler content in the conductive resin film is set to 70 wt % or more, and is preferably set to 80 wt % or more, the conduction starting voltage and the durometer hardness of the conductive resin film can be controlled in the appropriate ranges described above. Accordingly, the strain between the slider and the flexure caused by the formation of the conductive resin film can be reduced. In addition, even when the slider is electrified in an inspection step for checking the operation or the like, since the charges can be dissipated to the flexure by applying the conduction starting voltage described above, electrostatic breakdown of a thin-film element (such as an MR head) caused by the electrified slider can be prevented. As a result, concomitant with the trend toward miniaturization and higher performance of thin-film elements such as MR heads because of increases in magnetic recording density, even when the threshold voltage at which the electrostatic breakdown of the thin-film element occurs is further decreased, the magnetic head described above can satisfactorily withstand the condition described above, and electrostatic damage to the thin-film element can be further reliably prevented.

What is claimed is:

1. A magnetic head comprising:
    a slider having a thin-film element which performs at least one of writing and reading;
    a flexure bonded to the slider and having a tongue which is resiliently deformable; and
    a conductive resin film which electrically connects the slider to the flexure;
    wherein the conductive resin film has a non-zero conduction starting voltage of 2.0 V or less.

2. A magnetic head according to claim 1, wherein the conductive resin film has a non-zero conduction starting voltage of 1.0 V or less.

3. A magnetic head according to claim 1, wherein the conductive resin film comprises a thermoplastic elastomer and conductive filler, and the conductive filler content is 70 wt % or more.

4. A magnetic head according to claim 3, wherein the conductive filler content is 80 wt % or more.

5. A magnetic head according to claim 3, wherein the conductive resin film has a durometer hardness of less than D-40.

6. A magnetic head according to claim 3, wherein the conductive resin film has a durometer hardness of less than D-20.

7. A magnetic head according to claim 1, wherein, when a voltage of 0.5 V is applied across the slider and the flexure, the resistance is 1 KΩ or less.

8. A magnetic head according to claim 1, wherein, when a voltage of 0.1 V is applied across the slider and the flexure, the resistance is 1 KΩ or less.

9. A magnetic head according to claim 1, wherein a voltage equal to or more than a conduction starting voltage of the conductive resin film is applied across the slider and the flexure beforehand.

* * * * *